US006826654B2

(12) United States Patent
    Arimilli et al.

(10) Patent No.: US 6,826,654 B2
(45) Date of Patent: *Nov. 30, 2004

(54) CACHE INVALIDATION BUS FOR A HIGHLY SCALABLE SHARED CACHE MEMORY HIERARCHY

(75) Inventors: Ravi Kumar Arimilli, Austin, TX (US); Guy Lynn Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 205 days.

This patent is subject to a terminal disclaimer.

(21) Appl. No.: 10/216,630

(22) Filed: Aug. 8, 2002

(65) Prior Publication Data

US 2004/0030833 A1 Feb. 12, 2004

(51) Int. Cl.[7] .............................................. G06F 12/08
(52) U.S. Cl. ..................................... 711/141; 711/122
(58) Field of Search ................................ 711/141, 122

(56) References Cited

U.S. PATENT DOCUMENTS

2002/0152359 A1 * 10/2002 Chaudhry et al. .......... 711/141

OTHER PUBLICATIONS

The Authoritative Dictionary of IEEE Standards Terms, 2000, IEEE Press, Seventh Edition, pp. 266 and 712.*

* cited by examiner

*Primary Examiner*—Mano Padmanabhan
*Assistant Examiner*—Midys Inoa
(74) *Attorney, Agent, or Firm*—Casimer K. Salys; Dillon & Yudell LLP

(57) ABSTRACT

A symmetric multiprocessor data processing system having a highly scalable shared cache memory hierarchy is disclosed. The symmetric multiprocessor data processing system includes multiple processing units. Each of the processing units includes a level one cache memory. All the level one cache memories are associated with a level two cache memory. The level two cache memory is non-inclusive of all the level one cache memories. An invalidation bus is connected to all of the level one cache memories. In response to a write access to a specific cache line within one of the level one cache memories, the invalidation bus invalidates other cache lines that shared identical information with the specific cache line within the rest of the level one cache memories.

8 Claims, 2 Drawing Sheets

CACHE INVALIDATION BUS FOR A HIGHLY SCALABLE SHARED CACHE MEMORY HIERARCHY

RELATED PATENT APPLICATIONS

The present patent application is related to copending applications:
1. U.S. Ser. No. 10/216,632, filed on even date; and
2. U.S. Ser. No. 10/216,637, filed on even date.

All above-mentioned copending applications are assigned to the assignee of the present application, and the content of each is hereby incorporated herein by reference.

BACKGROUND OF THE INVENTION

1. Technical Field

The present invention relates to a data processing system in general, and in particular to a data processing system having a cache memory hierarchy. Still more particularly, the present invention relates to a data processing system having a highly scalable shared cache memory hierarchy.

2. Description of the Related Art

Broadly speaking, all processing units within a symmetric multiprocessor (SMP) data processing system are generally identical. In other words, all of the processing units within an SMP data processing system generally have the same architecture and utilize a common set or subset of instructions and protocols to operate. Each processing unit within the SMP data processing system includes a processor core having multiple registers and execution units for carrying out program instructions. The SMP data processing system may also include a cache memory hierarchy.

A cache memory hierarchy is a cache memory system consisting of several levels of cache memories, each level having a different size and speed. Typically, the first level cache memory, commonly known as the level one (L1) cache, has the fastest access time and the highest cost per bit. The remaining levels of cache memories, such as level two (L2) caches, level three (L3) caches, etc., have a relatively slower access time, but also a relatively lower cost per bit. It is quite common that each lower cache memory level has a progressively slower access time and a larger size.

Within a cache memory hierarchy, when multiple L1 caches share a single L2 cache, the L2 cache is typically inclusive of all the L1 caches. In other words, the L2 cache has to maintain an inclusivity bit per L1 cache line in an L2 directory. Consequently, the L2 directory, which is a costly resource, grows substantially as the total number of L1 cache lines increases. As a result, the additional inclusivity bit information in the L2 directory leads to a relatively large L2 cache design with slower access time to the L2 directory. Also, when the L2 cache needs to cast out a cache line, for example, to make spaces, the L2 cache must invalidate the associated cache line in the L1 cache because the L2 cache cannot track the inclusivity of that cache line anymore. However, the information in the L1 cache line that had been "involuntarily" casted out from the L1 cache may still be useful to the corresponding processor. The present disclosure provides a solution to the above-mentioned problems.

SUMMARY OF THE INVENTION

In accordance with a preferred embodiment of the present invention, a symmetric multiprocessor data processing system includes multiple processing units. Each of the processing units includes a level one cache memory. All the level one cache memories are associated with a level two cache memory. The level two cache memory is non-inclusive of all the level one cache memories. An invalidation bus is connected to all of the level one cache memories. In response to a write access to a specific cache line within one of the level one cache memories, the invalidation bus invalidates other cache lines that shared identical information with the specific cache line within the rest of the level one cache memories.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

For the purpose of illustration, the present invention is demonstrated using a symmetric multiprocessor (SMP) data processing system having three levels of cache memory. However, it should be understood that the features of the present invention may be applicable in any data processing system having multiple levels of cache memory.

I. Prior Art

Figure 1:
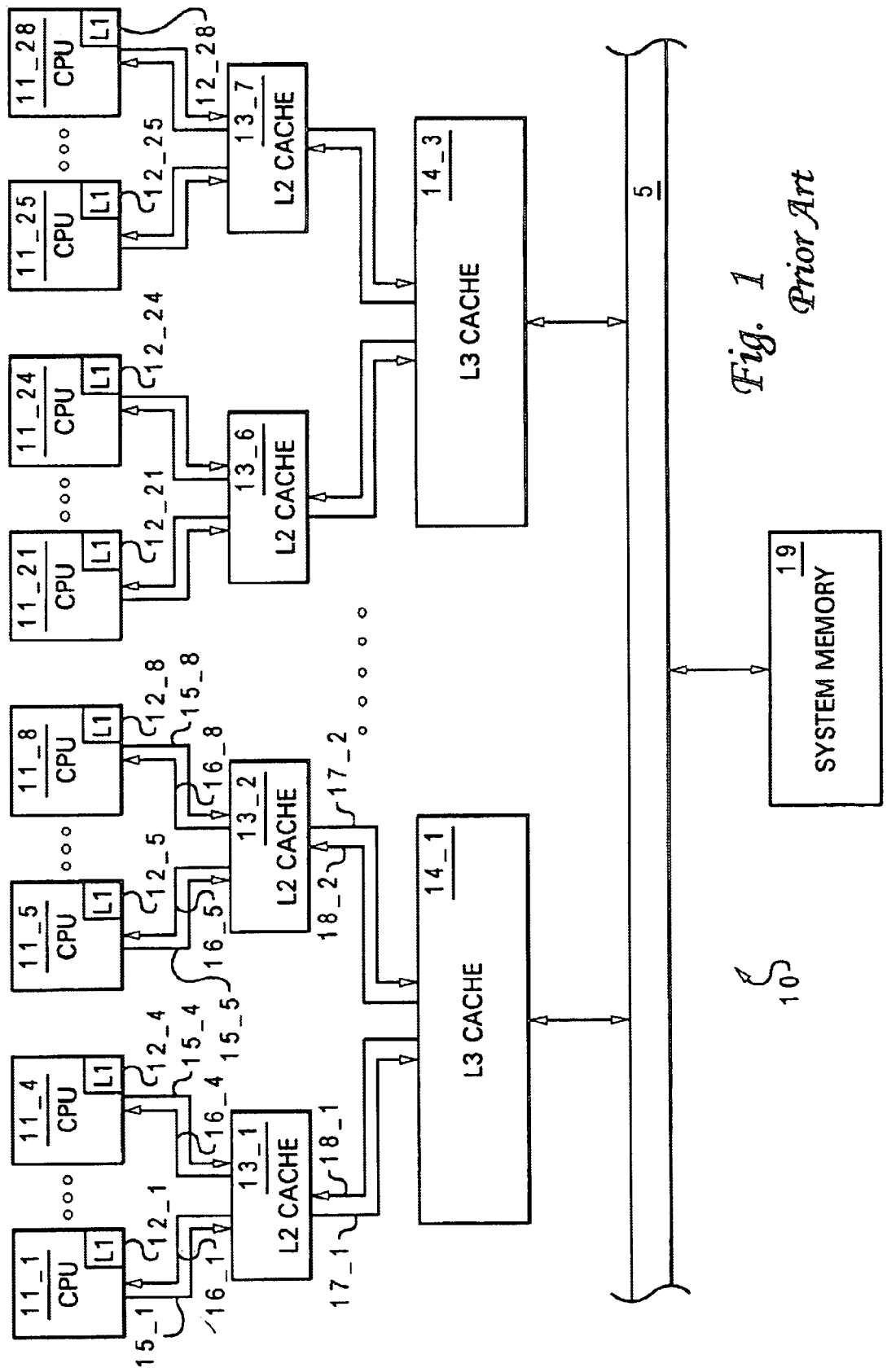
FIG. 1 is a block diagram of a symmetric multiprocessor data processing system according to the prior art.

Referring now to the drawings and, in particular, to FIG. 1, there is depicted a block diagram of an SMP data processing system, according to the prior art. As shown, a SMP data processing system 10 includes multiple central processing units (CPUs) 11_1–11_28, and each of CPUs 11_1–11_28 contains a level one (L1) cache. Further, CPU 11_1 contains an L1 cache 12_1, CPU 11_2 contains an L1 cache 12_2, etc. Each of CPUs 11_1–11_28 (including L1 caches 12_1–12_28) is coupled to a respective one of level two (L2) caches 13_1–13-7. Similarly, each of L2 caches 13_1–13_7 is coupled to a respective one of level three (L3) caches 14_1–14_3.

The lowest memory level for SMP data processing system 10 is a system memory 19. CPUs 11_1–11_28, L1 caches 12_1–12_28, L2 caches 13_1–13_7, and L3 caches 14_1–14_3 are coupled to system memory 19 via an interconnect 5. Interconnect 5 serves as a conduit for communication transactions between L3 caches 14_1–14_3 and other snoopers coupled to interconnect 5.

In the prior art cache memory hierarchy, as shown in FIG. 1, L2 caches 13_1–13_7 are all inclusive of their associated L1 caches. For example, L2 cache 13_1 is inclusive of L1 caches 12_1–12_4, and L2 cache 13_2 is inclusive of L1 caches 12_5–12_8, L2 cache 13_1 communicates with L1 caches 12_1–12_4 via a respective one of load/store request lines 15_1–15_4 and a respective one of L1 inclusivity lines 16_1–16_4. L2 cache 13_2 communicates with L1 caches 12_5–12_8 via a respective one of load/store request lines 15_5–15_8 and a respective one of L1 inclusivity lines 16_5–16_8. Similarly, L3 cache 14_1–14_3 are all inclusive of their associated L2 caches. For example, L3 cache 14_1 is inclusive of L2 caches 13_1–13_2, and L3 cache 14_3 is inclusive of L2 caches 13_6–13_7. L3 cache 14_1 communicates with L2 caches 13_1–13_2 via a respective one of load/store request lines 17_1–17_2 and a respective one of L1 inclusivity lines 18_1–18_2.

II. Non-Inclusive L2 Cache Structure

Figure 2:
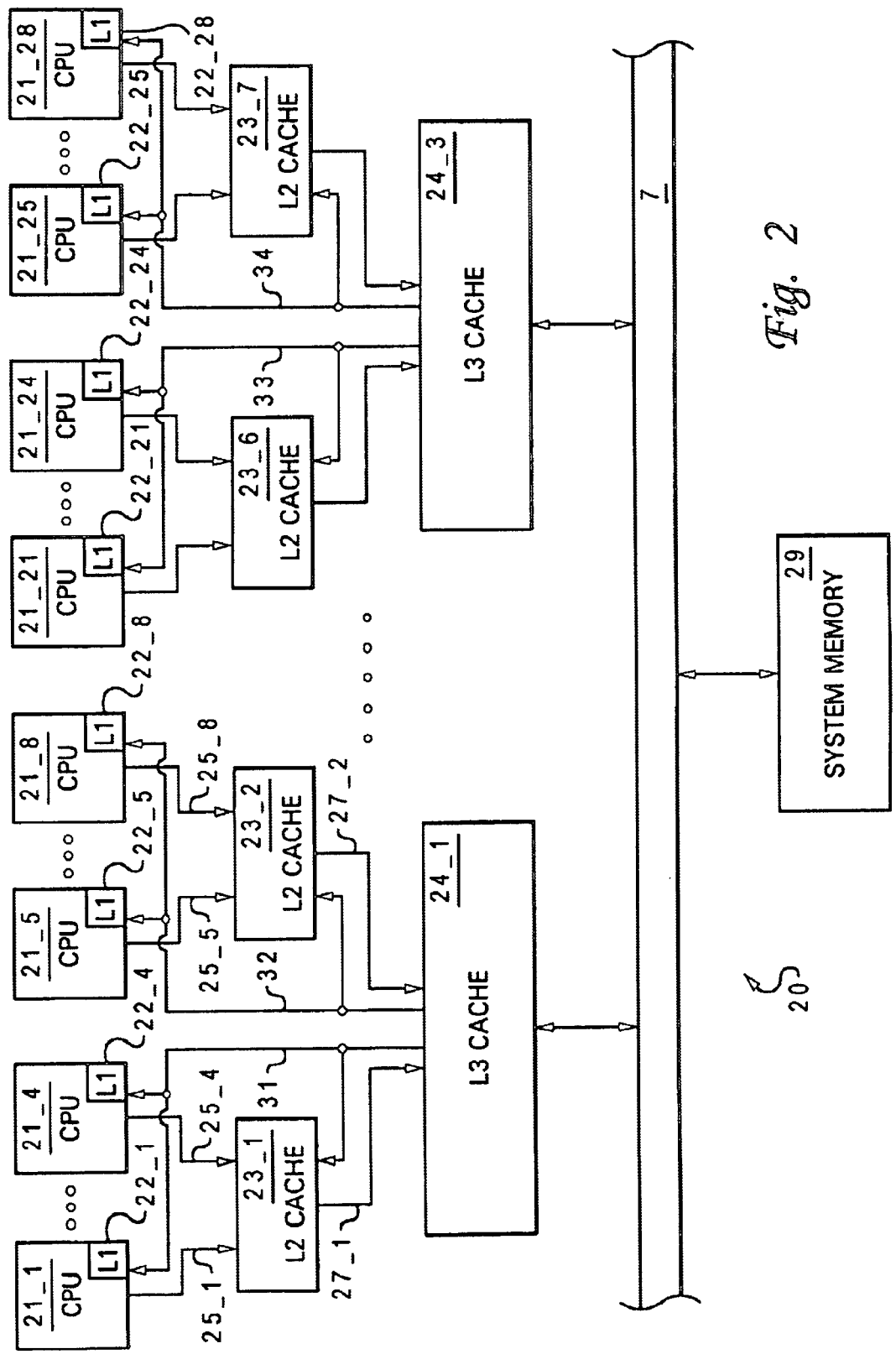
FIG. 2 is a block diagram of a symmetric multiprocessor data processing system in which a preferred embodiment of the present invention is incorporated.

With reference now to FIG. 2, there is depicted a block diagram of an SMP data processing system in which a preferred embodiment of the present invention is incorporated. As shown, a data processing system 20 includes multiple CPUs 21_1–21_28, and each of CPUs 21_1–21_28 contains a L1 cache. Further, CPU 21_1 contains an L1 cache 22_1, CPU 21_2 contains an L1 cache 22_2, etc. Each of CPUs 21_1–21_28 (including L1 caches 22_1–22_28) is coupled to a respective one of L2 caches 23_1–23_7. Similarly, each of L2 caches 23_1–23_7 is coupled to a respective one of L3 caches 24_1–24_3.

CPUs 21_1–21_28, L1 caches 22_1–22_28, L2 caches 23_1–23_7, and L3 caches 24_1–24_3 are coupled to a system memory 29 via an interconnect 7. Interconnect 7, which can be either a bus or a cross-point switch, serves as a conduit for communication transactions between L3 caches 24_1–24_3 and other snoopers coupled to interconnect 7. A typical transaction on interconnect 7 begins with a request, which may include a transaction field indicating the type of transaction, source and destination tags indicating the source and intended recipient(s) of the transaction, respectively, and an address and/or data. Each component connected to interconnect 7 preferably snoops all transactions on interconnect 7 and, if appropriate, responds to the request with a snoop response.

Each succeeding lower level from L1 caches 22_1–22_28 of the cache memory hierarchy is capable of storing a larger amount of information than upper levels, but at a higher access latency. For example, L1 caches 22_1–22_28 may each have 256 cache lines, each cache line being 128 byte, for a total storage capacity of 32 kilobytes, all at a single cycle latency. L2 caches 23_1–23_7 may each have 16,384 (16 k) 128-byte cache lines for a total storage capacity of 2 megabytes, all at a latency of approximately 10 cycles. L3 caches 24_1–24_3 may each have 2,684,354 (256 k) 128-byte cache lines for a total storage capacity of 32 megabytes, all at a latency of approximately 70 cycles. Finally, system memory 29 can store hundreds of gigabytes of data at a latency of at least 300 cycles. Given the large disparity in access latencies between the various levels of memories within the memory hierarchy, it is advantageous to reduce the frequency of access to lower levels of memories within the memory hierarchy, especially system memory 29.

Those skilled in the art will appreciate that data processing system 20 can include many additional components, such as bus bridges, input/output devices, non-volatile storage devices, ports for connection to networks, etc. Because those additional components are not necessary for understanding the present invention, they are not illustrated in FIG. 2 or discussed further herein. Although a preferred embodiment of an SMP data processing system is depicted in FIG. 2, it should be understood that the present invention can be implemented in a variety of data processing systems having a cache memory hierarchy.

In order to obtain valid execution results in data processing system 20, a single view of the contents of memory must be provided to all of CPUs 21_1–21_28 by maintaining a coherent cache memory hierarchy. A coherent cache memory hierarchy is maintained through the implementation of a cache memory coherency protocol, such as the conventional MESI protocol. According to the MESI protocol, an indication of a coherency state is stored in association with each coherency granule (such as a cache line or sector) of at least all upper level memories. Each coherency granule can have one of four states: Modified (M), Exclusive (E), Shared (S), or Invalid (I), which is typically indicated by two bits in a cache directory. The Modified state indicates that a coherency granule is valid only in the cache memory storing the modified coherency granule and that the value of the modified coherency granule has not been written to (i.e., is inconsistent with) system memory 29. When a coherency granule is indicated as Exclusive, the coherency granule is resident in, of all cache memories at that level of the cache memory hierarchy, only the cache memory having the coherency granule in the Exclusive state. The data in the Exclusive state is consistent with system memory 29, however. If a coherency granule is marked as Shared in the cache directory, the coherency granule is resident in the associated cache and may also be in cache memories at the same level of the cache memory hierarchy, all of the copies of the coherency granule being consistent with system memory 29. Finally, the Invalid state generally indicates that the data and address tag associated with a coherency granule are both invalid.

The state to which each coherency granule is set can be dependent upon a previous state of the cache line, the type of memory access sought by processors to the associated memory address, and the state of the coherency granule in other caches. Accordingly, maintaining cache coherency within data processing system 20 requires that CPUs 21_1–21_28 communicate messages across interconnect 7 indicating an intention to read or write memory locations. For example, when a CPU requires data not resident in its associated cache memory or memories, the CPU may issue a LOAD request on interconnect 7 specifying a particular memory address. The LOAD request is interpreted by its recipients as a request for only a single coherency granule in the lowest level cache in the CPU. The requested cache data is then provided to the requestor by a recipient determined by the coherency protocol, and the requestor typically caches the data in one of the valid states (i.e., M, E, or S) because of the probability that the cache line will again be accessed shortly.

With the present architecture, L2 caches 23_1–23_7 are all non-inclusive of their associated L1 caches. For example, L2 cache 23_1 is non-inclusive of L1 caches 22_1–22_4, L2 cache 23_2 is non-inclusive of L1 caches 22_5–22_8, etc. L3 cache 24_1–24_3 may be all inclusive or all non-inclusive of their associated L2 caches. However, it is preferable that L3 caches 24_1–24_3 to be inclusive such that L3 caches 24_1–24_3 can serve as filters for filtering all the information to and from interconnect 7. In the present embodiment, L3 cache 24_1 is inclusive of L2 caches 23_1–23_2, L3 cache 24_3 is inclusive of L2 caches 23_6–23_7, etc.

Each of L1 caches 22_1–22_4 communicates its LOAD or STORE requests (from a respective processor) with L2 cache 23_1 via a respective one of load/store request lines 25_1–25_4. Each of L1 caches 22_5–22_8 communicates its LOAD or STORE requests with L2 cache 23_2 via a respective one of load/store request lines 25_5–25_8. Similarly, each of L2 caches 23_1–23_2 communicates its LOAD or STORE requests with L3 cache 24_1 via a respective one of load/store request lines 27_1–27_2.

III. L1/L2 Cache Invalidate Bus

In accordance with a preferred embodiment of the present invention, an L1/L2 cache invalidation bus is coupled between an L3 cache and each of the associated L1 and L2 caches. For example, an L1/L2 cache invalidation bus 31 is coupled between L3 cache 24_1 and each of L1 caches 22_1–22_4 and L2 cache 23_1; and an L1/L2 cache invalidation bus 32 is coupled between L3 cache 24_1 and each of L1 caches 22_5–22_8 and L2 cache 23_2. L1/L2 cache invalidation bus 31 is "seen" by L1 caches 22_1–22_4 and L2 cache 23_1. Similarly, L1/L2 cache invalidation bus 32 is "seen" by L1 caches 22_5–22_8 and L2 cache 23_2. L1/L2 cache invalidation buses 31 and 32 carry invalidation information that L3 cache 24_1 snoops from interconnect 7. L1/L2 cache invalidation buses 31 and 32 may invalidate any cache lines in L1 caches 22_1–22_8 that are affected by a STORE operation on load/store request lines 27_1 and 27_2. Because the L1 caches are aware of the invalidation information that the L2 cache possesses, the L2 cache does not have to manage inclusivity for the associated L1 caches. Other L1/L2 cache invalidation buses shown in FIG. 2 are L1/L2 cache invalidation buses 33 and 34.

The topology of L1/L2 cache invalidation buses 31–34 can be multi-dropped, as shown in FIG. 2, or daisy-chained among multiple caches. For example, L1/L2 cache invalidation bus 31 may be connected to L1 caches 22_1–22_4 in a daisy-chained manner. Each of L1/L2 cache invalidation buses 31–34 includes one Invalidation_Val line and several Invalidation_Addr lines. For a 128-byte cache line address in the present embodiment, Invalidation_Addr lines are preferably 57 bits wide. For example, 0–56 bits of the Invalidation_Addr lines may specify the cache line address in a data processing system where the a byte address is defined as 64-bit wide. Invalidation_Val line is a signal line for indicating whether or not a cache invalidation is valid.

During operation, if a processing unit, for example, CPU 21_5 would like to perform a STORE operation to a cache line in its L1 cache 22_5, then L3 cache 24_1 would be aware of such information by, for example, detecting a request for the STORE operation on load/store request line 27_2. In response, L3 cache 24_1 then places the invalidation address on the Invalidation_Addr lines of L1/L2 cache invalidation buses 31 and 32, and sets one of the corresponding Invalidation_Val line of L1/L2 cache invalidation buses 31 and 32 valid. If L3 cache 24_1 has the same cache line either in a Shared or Invalid state (i.e., not in a Modified or Exclusive state), L3 cache 24_1 must also notify the other L3 caches, such as L3 cache 24_3, by sending a request (such as a RWITM or DClaim request) on interconnect 7. Because L1/L2 cache invalidation buses 31 and 32 are non-blocking (i.e., cannot be retried or the request must be completed within a fixed number of processor cycles), all the cache lines within the L1 and L2 caches that are in a Shared state with the cache line that the STORE operation has been performed are invalidated simultaneously within the next cache cycle.

As has been described, the present invention provides an L1/L2 cache invalidation bus for a data processing system having a highly scalable shared cache memory hierarchy. In the present embodiment, the L1/L2 cache invalidation bus is coupled between a L3 cache and each of the associated L1 and L2 caches. As such, the L1/L2 cache invalidation bus can simultaneously invalidate all L1 and L2 cache lines that are in a Shared state with an L1 cache line to which a STORE operation has been performed.

While the invention has been particularly shown and described with reference to a preferred embodiment, it will be understood by those skilled in the art that various changes in form and detail may be made therein without departing from the spirit and scope of the invention.

What is claimed is:

1. A data processing system, comprising:

a plurality of processing units;

a plurality of level one cache memories, wherein ones of said plurality of level one cache memories are associated with respective ones of said plurality of processing units, wherein said plurality of level one cache memories are non-blocking cache memories that do not allow retry operations;

a level two cache memory associated with said plurality of level one cache memories, wherein said level two cache memory is non-inclusive of said plurality of level one cache memories; and an invalidation bus, connected to said plurality of level one cache memories, for invalidating, in response to a STORE operation on a specific cache line within one of said plurality of level one cache memories, cache lines that share identical information with said specific cache line.

2. The data processing system of claim 1, wherein said invalidation bus includes an Invalidation$_{13}$ Val line and a plurality of Invalidation_Addr lines.

3. The data processing system of claim 1, wherein said invalidation bus is connected to said plurality of level one cache memories in a multi-drop manner.

4. The data processing system of claim 1, wherein said invalidation bus is connected to said plurality of level one cache memories in a daisy-chain manner.

5. A method for invalidating multiple cache lines within a multi-level memory hierarchy within a data processing system having a plurality of processing units, said method comprising:

associating a level one cache memory with a respective one of said plurality of processing units, wherein said plurality of level one cache memories are non-blocking cache memories that do not allow retry operations;

associating a level two cache memory with said plurality of level one cache memories, wherein said level two cache memory is non-inclusive of said plurality of level one cache memories; and in response to a STORE operation on a specific cache line within one of said plurality of level one cache memories, invalidating cache lines that shared identical information with said specific cache line within the rest of said plurality of level one cache memories by utilizing an invalidation bus connected to said plurality of level one cache memories.

6. The method according to claim 5, wherein said invalidation bus includes an Invalidation_Val line and a plurality of invalidation_Addr lines.

7. The method according to claim 5, wherein said method further includes connecting said invalidation bus to said plurality of level one cache memories in a multi-drop manner.

8. The method according to claim 5, wherein said method further includes connecting said invalidation bus to said plurality of level one cache memories in a daisy-chain manner.

* * * * *

UNITED STATES PATENT AND TRADEMARK OFFICE
CERTIFICATE OF CORRECTION

PATENT NO. : 6,826,654 B2
DATED : November 30, 2004
INVENTOR(S) : Arimilli et al.

It is certified that error appears in the above-identified patent and that said Letters Patent is hereby corrected as shown below:

<u>Column 6,</u>
Lines 24-26, please replace with the following:

2. The data processing system of claim 1, wherein said invalidation bus includes an Invalidation_Val line and a plurality of Invalidation_Addr lines.

Signed and Sealed this

Eighteenth Day of October, 2005

JON W. DUDAS
*Director of the United States Patent and Trademark Office*